United States Patent [19]

Lutin

[11] 4,240,213
[45] Dec. 23, 1980

[54] EDUCATIONAL AMUSEMENT DEVICE FOR MATCHING WORDS WITH NON-VERBAL SYMBOLS

[76] Inventor: Matthew R. Lutin, 1551 N. 12th Ct., Hollywood, Fla. 33020

[21] Appl. No.: 81,544

[22] Filed: Oct. 3, 1979

[51] Int. Cl.³ .............................................. G09B 19/02
[52] U.S. Cl. ...................................... 434/194; 434/193
[58] Field of Search ........................ 35/31 R, 31 G, 30

[56] References Cited

U.S. PATENT DOCUMENTS

| | | | |
|---|---|---|---|
| 1,244,000 | 10/1917 | Soltoft | 35/31 G |
| 2,402,892 | 6/1946 | Hubble | 35/31 R |
| 2,965,978 | 12/1960 | Olson | 35/23 R |
| 3,212,202 | 10/1965 | Heinichen | 35/31 R |
| 3,311,997 | 4/1967 | Denny | 35/31 R |
| 3,339,291 | 9/1967 | Ruchlis | 35/31 R |
| 3,424,455 | 1/1969 | Dunson | 35/30 X |
| 3,486,244 | 12/1969 | Horn | 35/31 R |
| 3,774,908 | 11/1973 | Greenberg | 273/1 R |
| 3,797,133 | 3/1974 | Douglass et al. | 35/34 |
| 3,817,526 | 6/1974 | Bibb | 273/390 |

FOREIGN PATENT DOCUMENTS 650205 2/1951 United Kingdom ................... 35/31 R Primary Examiner—William H. Grieb
Attorney, Agent, or Firm—Oltman and Flynn

[57] ABSTRACT

The present educational amusement device includes a horizontally pivoted balance arm and several pairs of matched game pieces. The game pieces of each pair include one which displays a non-verbal symbol and another one which displays the word for that symbol. The game pieces of each pair are equal in weight to each other but different in weight from the game pieces of every other pair. Therefore, the balance arm will assume a horizontal position only if two game pieces placed on it belong to the same pair. A downwardly extending front wall of the balance arm presents a window which registers with and fully uncovers a smiling face symbol on the pivotal support for the balance arm only when the balance arm is horizontal.

8 Claims, 4 Drawing Figures

EDUCATIONAL AMUSEMENT DEVICE FOR MATCHING WORDS WITH NON-VERBAL SYMBOLS

SUMMARY OF THE INVENTION

The present invention relates to an educational amusement device for teaching a child or other player to match words with corresponding non-verbal visual symbols, such as numerals.

Various balance games or toys have been proposed heretofore, such as ones disclosed in the following U.S. patents: Dunson, U.S. Pat. No. 3,424,455; Greenberg, U.S. Pat. No. 3,774,908; and Bibb, U.S. Pat. No. 3,817,526.

None of the prior games of which I am aware had the capability of teaching a child or other player to match words with numerals or other non-verbal visual symbols, so as to improve the player's verbal skill while at the same time entertaining him. The present invention is directed to an educational amusement device which fills this need by providing matched pairs of verbal and non-verbal game pieces, with the game pieces of each pair being equal in weight to each other but different in weight from the game pieces of every other pair. The player places two game pieces, one non-verbal and the other verbal, on a horizontally pivoted balance bar, and the balance bar will stay horizontal only if the two game pieces belong to the same pair. The present device has provision for informing the player in a non-verbal way whether he or she has properly matched the two game pieces. Preferably, this is done by a window on the front of the balance bar which registers fully with a visual symbol, such as a smiling face, on the pivotal support for the balance bar only if the balance bar is horizontal.

A principal object of this invention is to provide a novel and improved educational amusement device for teaching a child or other player to match words with corresponding non-verbal symbols, such as numerals.

Further objects and advantages of this invention will appear from the following description and appended claims, reference being had to the accompanying drawing forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE INVENTION

Figure 1:
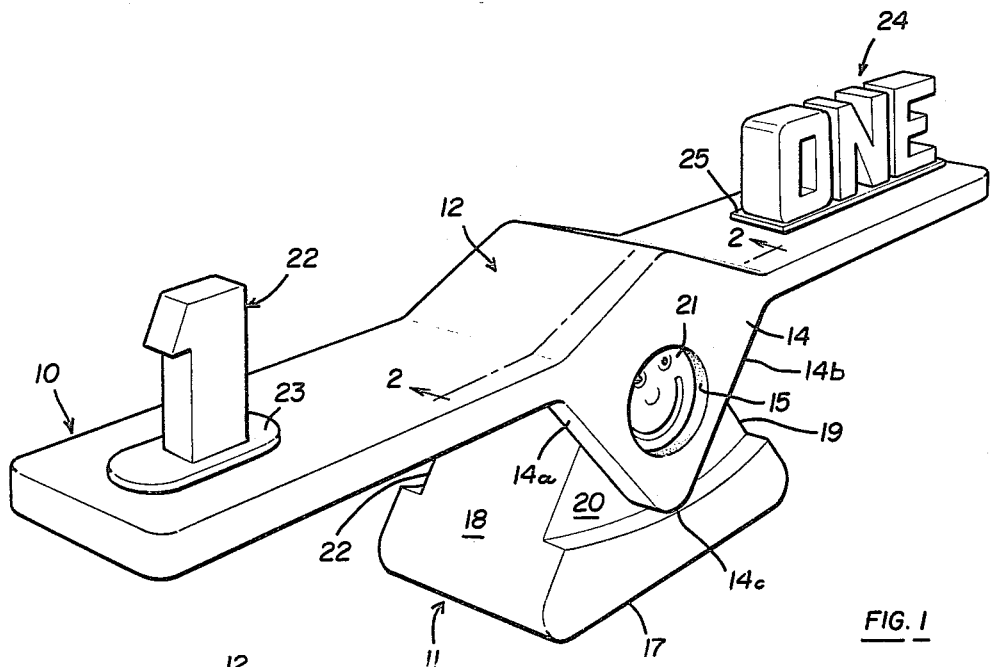
FIG. 1 is a front perspective view of the present device.

Referring to FIG. 1, the present device has a balance arm 10 horizontally pivoted on a base 11.

The balance arm 10 is flat along its length except at the middle, where it presents an upwardly projecting segment 12 defined by oppositely inclined walls 12a and 12b (FIG. 2) which intersect midway along the balance arm at its center of gravity. The upwardly projecting segment 12 defines an inverted V, and it presents an inverted V-shaped recess 13 which is open at the bottom of the balance arm. The apex of this recess is equidistant from the opposite ends of the balance arm and it is at the balance arm's center of gravity.

The balance arm has a front wall 14 which extends down from its upwardly projecting segment 12 at the front edge of the balance arm. This front wall has a circular opening 15 which defines a window, for purpose explained hereinafter. Below and on opposite sides of its inverted V-shaped recess 13, the front wall 14 has oppositely inclined edges 14a and 14b which intersect at a rounded bottom corner 14c.

The balance arm has a similar back wall 16 which, however, does not have an opening corresponding to the front wall opening 15. This back wall extends down at the back edge of the balance arm directly behind the front wall 14.

Figure 2:
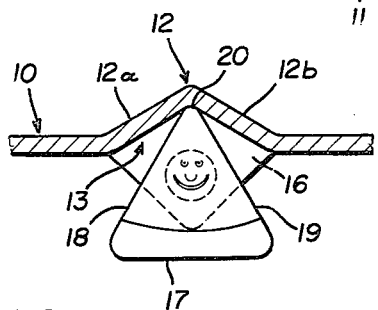
FIG. 2 is a fragmentary longitudinal sectional view taken along the line 2—2 in FIG. 1, showing the pivotal fulcrum for the balance arm in the device.

The base 11 presents a flat bottom face 17 of broad area which may rest on any suitable support, such as the top of a table or the floor. Above its bottom face the base is generally triangular, presenting oppositely inclined end faces 18 and 19 which intersect at a rounded top corner 20 defining the apex of the base. This top corner 20 of the base seats in the rounded, downwardly-facing apex of the inverted V-shaped recess 13 at the middle of the balance arm 10, as shown in FIG. 2. The angle between the opposite end faces 18 and 19 of the base 11 is substantially less than the angle between the oppositely inclined walls 12a and 12b of the recess 13 in the balance arm, so that the balance arm can pivot through a substantial angle in either direction from a horizontal position on the base.

Figure 3:
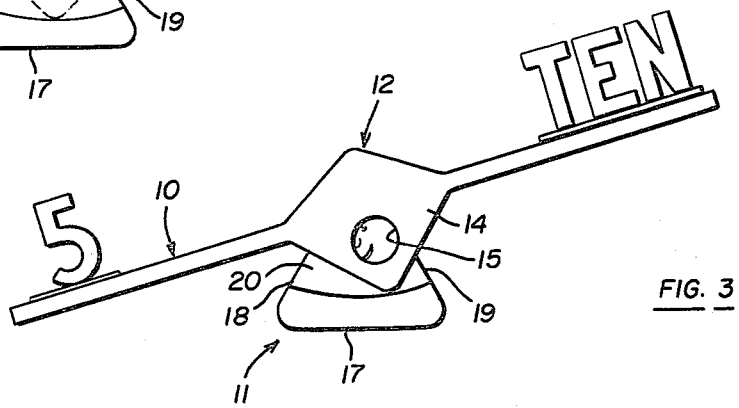
FIG. 3 is a front elevational view of the device with the balance bar unbalanced because of unmatched games pieces on opposite sides of its pivotal fulcrum.
Figure 4:
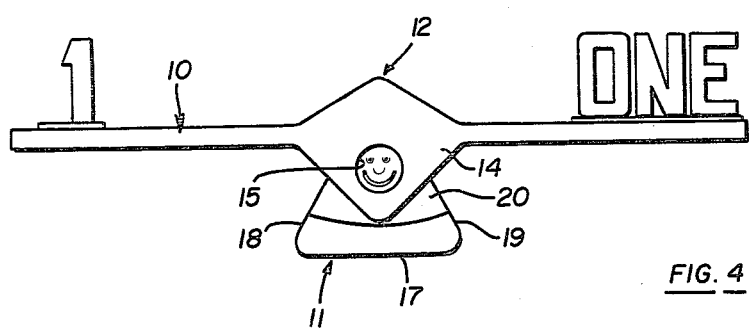
FIG. 4 is a view similar to FIG. 3 and showing the device balanced by game pieces of equal weight on the balance arm.

A short distance above its bottom face 17 the base 11 is cut away at the front to receive the depending front wall 14 of the balance arm. At this cut-away front segment the flat front surface 20 of the base displays a visual symbol 21, which preferably is a smiling face, as shown. The window 15 in the depending front wall 14 of the balance arm registers with this visual symbol 21 and substantially completely uncovers it when the balance arm is horizontal, as shown in FIGS. 1 and 4. However, when the balance arm is tilted in either direction substantially from the horizontal (FIG. 3), the depending front wall 14 will cover part of the visual symbol 21 and the window 15 will expose only the remaining part of this symbol.

At the back, the base 11 presents a similar cut-away segment at 22 for receiving the depending back wall 16 of the balance arm.

With this arrangement, the middle of the balance arm 10 straddles the base 11 and can rock pivotally on the base in either direction from a horizontal position.

In accordance with the present invention, a plurality of pairs of matched game pieces are provided, each pair including a first game piece which displays a non-verbal symbol (such as an Arabic numeral) and a second game piece which displays a word that corresponds to the non-verbal symbol of the first game piece of that pair. For example, as shown in FIG. 1, one pair of game pieces includes a first game piece 22 which consists of the numeral "1" on a flat base 23 and a second game piece 24 which consists of the letters "O", "N" and "E" in succession from left to right on a flat base 25. Each of these game pieces is of integral one-piece construction.

The game pieces of each pair are of the same weight. Therefore, when placed on the balance bar 10 equidistantly on opposite sides of its pivotal fulcrum, the balance bar will assume a horizontal position, as shown in FIGS. 1 and 4. In this position of the balance bar, the window 15 registers with the smiling face symbol 21 on the front of the base 11 and completely uncovers that symbol to indicate in a non-verbal way to the child or other player that he has correctly matched the non-verbal first game piece with the word game piece of the same pair.

The non-verbal and word game pieces of each of the other pairs are equal in weight to each other but different from the weight of either game piece in any other pair. Therefore, if the player selects a first (non-verbal symbol) game piece and a second (word) game piece which do not correspond to one another, the balance bar will tilt down at the end carrying the heavier game piece of the mis-matched pair. Consequently, the window 15 in the depending front wall 14 of the balance bar will be at least partially out of registration with the smiling-face symbol 21 on the front of the base, and this partial covering of this smybol will tell the player in a visual, non-verbal way that he or she has not correctly matched the two game pieces. This action is illustrated in FIG. 3.

If desired, the non-verbal visual symbol of each pair may display something other than a numeral. For example, it may display a miniature, three-diamensional replica of an orange, apple, grape, etc. In that case, the word game piece of the same pair will, of course, display the word for the object depicted by the non-verbal game piece. The game pieces may sit in indentations in the balance arm.

I claim:

1. In an educational amusement device for teaching a player to match words with corresponding non-verbal visual symbols, said amusement device having a balance arm and means providing a horizontal pivotal fulcrum for the balance arm at its center of gravity, the improvement which comprises:
   a plurality of integral first game pieces of different weights which display different non-verbal symbols;
   a plurality of integral second game pieces displaying different words which correspond respectively to the non-verbal symbols displayed by said first game pieces, each of said second game pieces having the same weight as the respective first game piece which displays the corresponding non-verbal symbol;
   and visual indicator means for indicating whether the balance arm is horizontally balanced by first and second game pieces of equal weight on opposite sides of its pivotal fulcrum.

2. An educational amusement device according to claim 1, wherein said first games pieces display different Arabic numerals.

3. An educational amusement device according to claim 2, wherein:
   said means providing the pivotal fulcrum comprises a base having an upwardly extending front surface with a smiling face depicted thereon;
   and said balance arm has a depending front wall which extends down in front of said front surface on the base, said front wall presenting a window which registers with and substantially completely uncovers said smiling face when the balance arm is horizontal and partially blocks said smiling face when the balance arm is tilted substantially in either direction from the horizontal.

4. An educational amusement device according to claim 1, wherein:
   said balance arm presents at its center of gravity an inverted V-shaped recess which is open at the bottom of the balance arm;
   and said means providing the pivotal fulcrum for the balance arm comprises a base presenting an upwardly extending inverted triangular segment with an apex at the top which seats in the apex of said recess in the balance arm to provide the pivotal fulcrum for the balance arm.

5. An educational amusement device according to claim 4, wherein said balance arm presents depending front and back walls which extend down across said upwardly extending, inverted triangular segment of the base at the front and back of the latter, respectively.

6. An educational amusement device according to claim 4, wherein:
   said upwardly extending, inverted trangular segment of the base presents a visual symbol at the front;
   and said depending front wall on the balance arm presents a window which registers with and substantially completely uncovers said visual symbol on the front of the base when the balance arm is horizontal and partially blocks said last-mentioned symbol when the balance arm is tilted substantially in either direction from the horizontal.

7. An educational amusement device according to claim 6, wherein said visual symbol on the front of the base is a smiling face.

8. An educational amusement device according to claim 2, wherein said first pieces display different Arabic numerals.

* * * * *